Figure 1:
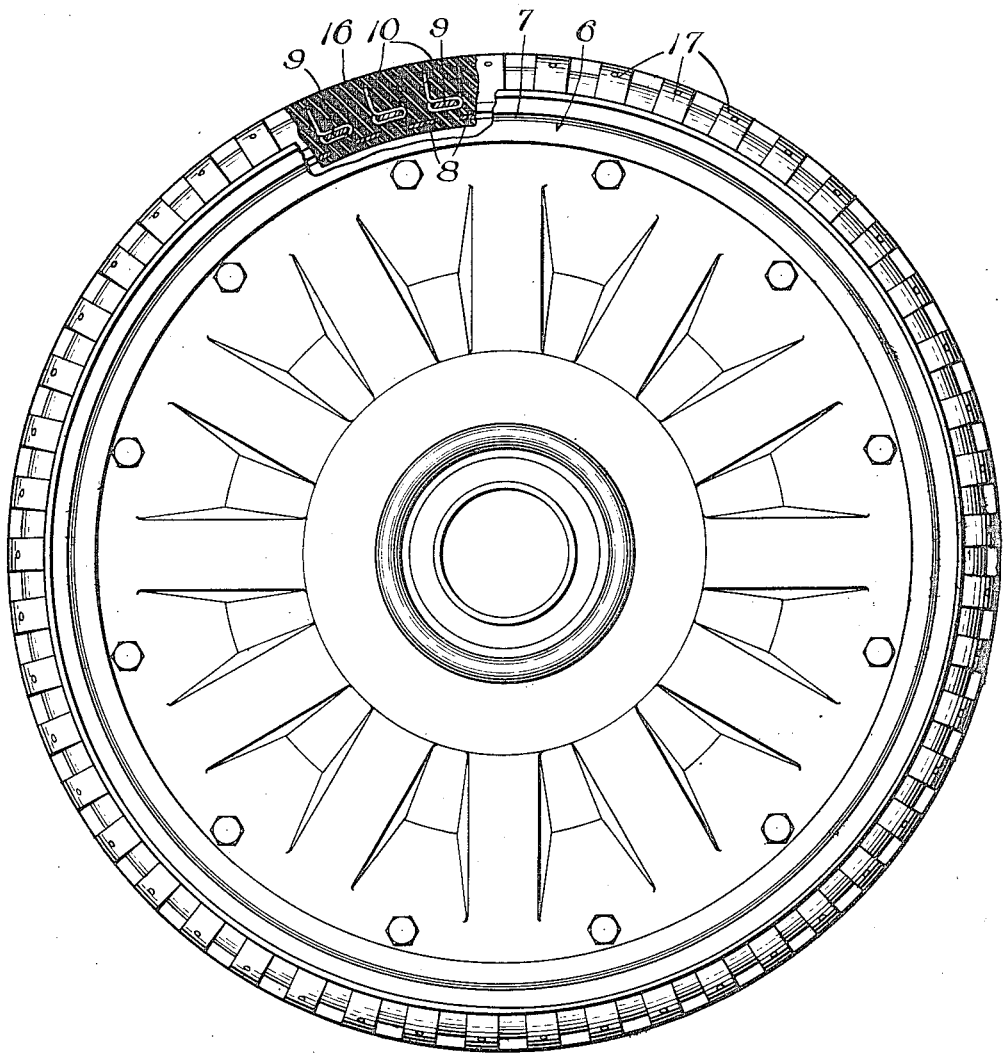

W. SEIDEL.
WHEEL TREAD.
APPLICATION FILED NOV. 12, 1914.

1,169,575.

Patented Jan. 25, 1916.
2 SHEETS—SHEET 1.

Witnesses:

Inventor:
William Seidel
by
Attys.

W. SEIDEL.
WHEEL TREAD.
APPLICATION FILED NOV. 12, 1914.
1,169,575.
Patented Jan. 25, 1916.
2 SHEETS—SHEET 2.
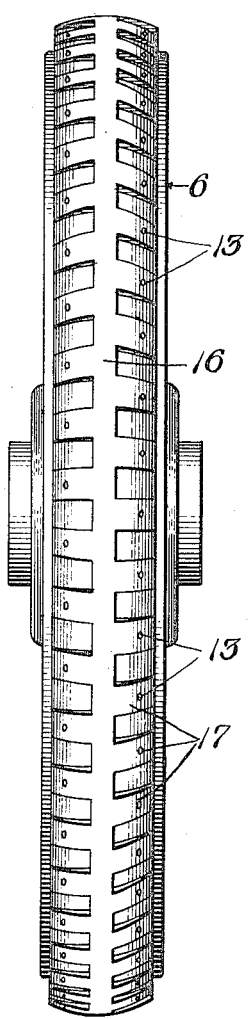
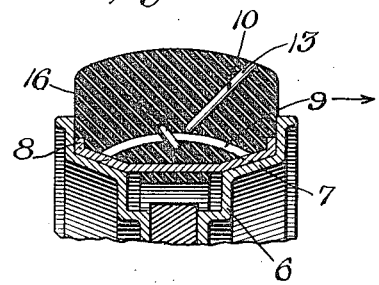
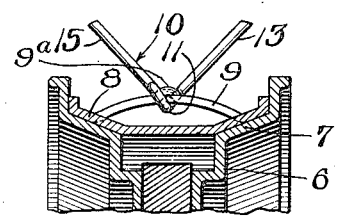
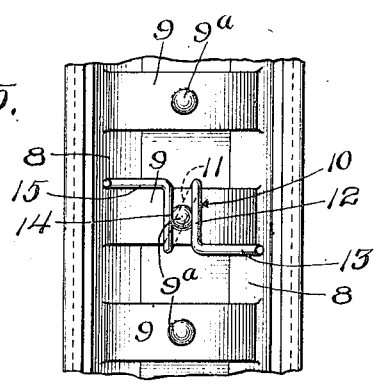
Witnesses:
Inventor:
William Seidel

UNITED STATES PATENT OFFICE.

WILLIAM SEIDEL, OF CHICAGO, ILLINOIS.

WHEEL-TREAD.

1,169,575.   Specification of Letters Patent.   Patented Jan. 25, 1916.

Application filed November 12, 1914.   Serial No. 871,840.

*To all whom it may concern:*

Be it known that I, WILLIAM SEIDEL, a citizen of the United States, residing at Chicago, in the county of Cook and State of Illinois, have invented certain new and useful Improvements in Wheel-Treads, of which the following is a specification.

The present invention relates to a tread used in conjunction with automobile and similar wheels.

The objects of the present invention are to provide a tread which will eliminate the noise and racket incident to the use of a metal or wooden tread, which will be composed of metal and resilient material so combined as to not interfere with the cushioning properties of the resilient material of the tread, and at the same time allow the metal to exert its wear resisting properties.

A further object of the invention is to so arrange the metal as to permit of compression of the tread under the effect of pressure exerted on the outer face thereof and to impart rigidity to the tread to prevent slippage of the tread off from the rim of the wheel when a side strain is exerted on said tread.

The invention further consists in the features of construction and combinations of parts hereinafter described and claimed.

In the drawings: Figure 1 is an elevation of a wheel equipped with the tread of the present invention and showing a portion of the wheel broken out and a portion of the tread in section; Fig. 2 is an edge view of such wheel with the tread of the present invention thereon; Fig. 3 is a cross section through the completed tread; Fig. 4 is a view similar to Fig. 3 with the resilient portion of the tread removed; and Fig. 5 is a plan view of a portion of the metal part of said tread.

As stated, the present invention relates to a tread for automobiles and similar wheels. In the drawings it is shown as applied to a wheel of the character shown and described in an application for Letters Patent of the United States, Serial No. 869,132, filed October 28, 1914, for resilient wheels, although, of course, the tread is not in any sense limited to use with this particular type of wheel, but is capable of use with any type of wheel upon which it may be applied.

In the art to which the present invention relates two qualities are essential to the production of a practical tread. First, it must possess cushioning properties, whereby it will act to absorb shock and prevent the rattle and noise incident to the use of metal or wooden treads. Second, it must be formed in a manner so that the cushioning material will not unduly wear out, and to provide against this a most expedient means is the co-mingling of metal or similar material with the resilient material in a manner whereby the shock absorbing and cushioning properties of the resilient material is not impaired, and the wear resisting property of the metal material is present.

In the present invention a tread has been devised which is resilient in nature, and at the same time possesses the necessary wearing qualities. Referring to the drawings, the tread is shown as applied to the periphery of a wheel 6 which may be of any suitable form practical to the employment of a tread of the character of the present invention. The rim of the wheel in the construction shown is formed with a channel 7 for receiving the tread, and the tread proper comprises a metal base or rim 8 of suitable material and size, which base is in the form of a ring, and at periodical intervals, in the construction shown, the periphery of the ring is pressed outward to provide raised or outwardly extending portions 9. These outwardly extending portions serve as retainers or anchors for a series of metal reinforcements 10, which reinforcements are preferably made of wire. There is one reinforcement for each retainer, and each reinforcement is secured to its respective retainers by bending it whereby one portion of the wire forming said reinforcement extends beneath the raised portion 9 of the ring 8, and is then bent to form a portion 12 which extends from one side of the raised portion 9 across the top thereof and to the opposite side and is then bent to extend outwardly and upwardly in the form of an extending arm or finger 13, as will be clearly seen from Figs. 3 and 5. A second portion 14 of the wire is bent to extend across the top of the raised portion 9 in an opposite manner from the portion 12, and this portion 14, is then bent to extend outwardly and upwardly in the form of an extending arm or finger 15. The arms 13 and 15, as will be apparent from Figs. 3 and 5, extend from opposite sides of the raised or crosswise extending member 9 and in diverging relation from one another and terminate at the outer portion of the tread. After the wires have been placed in the manner shown and described a resilient portion 16 is molded onto the metal portion, and this resilient portion may, if desired, be formed on its outer face with suitable ribs or lugs 17, as in Fig. 2. After the resilient portion has been placed in position the portions 9 really constitute metal members extending crosswise of the resilient portion and embedded therein, and the wires 10 are also embedded in such resilient portion. The resilient portion gives to the tire the shock absorbing and cushioning properties eliminating the noise and rattle incident to the use of metal or wooden treads and acting to absorb the shock incident to wheels striking abutments. The wire which is intermingled and associated with the resilient portion gives to the tread its wearing qualities. It is obvious that the ends of the wire extending as they do, to the periphery of the tread, produce an amount of metal around the tread which serves to preserve the relatively disintegratible resilient or cushioning portion against undue wear during use.

The arrangement of the wires is such as not to impair or detract from the resilient properties of the cushioning material, since when a strain is placed on the periphery of the tread, such as would occur in travel, by reason of the contact of the tread with the road, such strain will act to spread the ends of the wires apart, and owing to the method of mounting the wires it is evident that they can spring apart so as to permit of the flattening out or compression of the tread during travel. In such springing movement the parts of the wire on the top of the crosswise extending member 9, twist or rock allowing the arms 13 and 15 to spread apart under a tension caused by the rocking or twisting of the wire along the top of the member 9. It is important in treads of this character to prevent the resilient portion of the tread unduly compressing under a side strain, as for instance when a vehicle is turning a curve, and become disconnected from the rim of the wheel, and the wires 10, in the present invention, serve to reinforce the tread and prevent such displacement by side strains.

It is obvious from an inspection of the drawings that, if a strain should be exerted in the direction of the arrow in Fig. 3 the arm 13 of the wire 10 could not move to any material degree, owing to the contact engagement of the portions 12 and 14 of the wire on top of the raised portion 9. A strain in the direction indicated would merely serve to cause that part of the wire wrapped around the raised portion 9 to undergo a canting action tending to make it bite into and hold more firmly against the raised portions 9, and thus giving rigidity to the resilient portion, and such rigidity braces the resilient portion whereby a slippage of the same off from the rim of the wheel is eliminated.

It will thus be apparent that the construction employed gives the desired resiliency to the tread, imparts to the tread wearing qualities, and braces the tread to prevent its slipping off from the rim of the wheel under the effect of side strains.

Each of the crosswise extending members 9 is raised as at $9^a$, which forms a stop to prevent the wires 10 from sliding crosswise of the member 9, and thus prevent any displacement of the same. A further function of the arms 13 is that in turning corners, etc., the resilient member will be forced back and away from the end of the arms whereby said arms under such conditions exert a biting action on the pavement and prevent skidding.

I claim:

1. A tire tread comprising a body of resilient material, a metallic rim for receiving said body, said rim being pressed outward at intervals to form metallic members extending crosswise of the material, metallic members affixed to said crosswise extending members, and said affixed members embodying divergently extending arms extending to the outer portion of the body, substantially as described.

2. A tire tread comprising a body of resilient material, a rim for receiving said resilient material, members carried by said rim and extending outwardly therefrom and crosswise of the material, members affixed to said crosswise extending members, and said affixed members comprising divergently arranged arms extending to the outer portion of the body, substantially as described.

3. A tire tread comprising a body of resilient material, reinforcing members embedded in said material and arranged transversely of the wheel tread to form a circumferential series, each of said reinforcing members consisting of a spring wire bent medially to provide outwardly extending divergent arms, each of said arms terminating at the outer portion of the body, each member being formed with a loop at the point of bend therein, means for anchoring said members in place within said body, and said anchoring means extending through the loop portion of said reinforcing members, substantially as described.

4. A tire tread comprising a body portion of resilient material, members extending crosswise of said material at periodic intervals and embedded in said material, a resilient wire associated with each of said crosswise extending members, said wires passing beneath the crosswise extending members with which it is associated and bent to extend across the top of said members from opposite directions and with the free ends of said wires extending to the outer portion of the resilient material, substantially as described.

5. A tire tread comprising a body of resilient material, members embedded in said material and extending crosswise thereof, a section of resilient metal secured to each of said crosswise extending members, each of said sections of resilient metal extending beneath the crosswise extending member with which it is associated and bent at each side to extend across the top of said crosswise extending member from opposite sides thereof and then bent to have the free ends extending outwardly in a diverging relation to one another to the outer portion of said body, substantially as described.

6. A tire tread comprising a body of resilient material, a metal rim for receiving said body, said rim being pressed outward at intervals to form outwardly extending members embedded in said body and extending crosswise thereof, and a metal strip wrapped around each of said crosswise extending members with the free ends of the strip extending upwardly to the outer portion of the body, substantially as described.

7. A tire tread comprising a body of resilient material, a metal rim for receiving said body, said metal rim being pressed outward at intervals to form members extending crosswise of the body and embedded therein, and a metal strip associated with each of said crosswise extending members, each of said strips extending beneath the member with which it is associated and bent at each side to extend across the top of such member from opposite directions and with its free ends extending outwardly from said member in diverging relation and to the outer portion of the body, substantially as described.

8. A tire tread comprising a body portion of resilient material, members extending crosswise of said material at periodic intervals and embedded in said material, a metal strip associated with each of said crosswise extending members, said strips passing beneath the crosswise extending member with which it is associated and bent to extend across the top of said member from opposite directions and with the free ends of said strips extending to the outer portion of the resilient material, a protuberance on said crosswise extending member, and said strip passing across the top of said crosswise extending member on each side of said protuberance, substantially as described.

WILLIAM SEIDEL.

Witnesses:
WM. P. BOND,
THOMAS A. BANNING, Jr.